United States Patent
Shim et al.

(10) Patent No.: US 7,953,398 B2
(45) Date of Patent: May 31, 2011

(54) METHOD FOR RECEIVING INCOMING CALL IN MOBILE COMMUNICATION TERMINAL USING LOCAL WIRELESS COMMUNICATION DURING USER ABSENCE

(75) Inventors: Gyu Seok Shim, Gumi-si (KR); Dong Han Kang, Daegu Metropolitan (KR); Jae Gwan Shin, Daegu Metropolitan (KR); Chang Min Oh, Daegu Metropolitan (KR)

(73) Assignee: Samsung Electronics Co., Ltd., Suwon-si (JP)

( * ) Notice: Subject to any disclaimer, the term of this patent is extended or adjusted under 35 U.S.C. 154(b) by 998 days.

(21) Appl. No.: 11/773,672

(22) Filed: Jul. 5, 2007

(65) Prior Publication Data

US 2010/0022230 A1    Jan. 28, 2010

(30) Foreign Application Priority Data

Jul. 28, 2006  (KR) .................. 10-2006-0071285

(51) Int. Cl.
H04M 3/42        (2006.01)
(52) U.S. Cl. .................... 455/417; 455/445; 455/412.2; 455/413; 455/415; 455/421; 455/428; 455/458
(58) Field of Classification Search .................. 455/445, 455/412.2, 413, 415, 417, 421, 428, 458
See application file for complete search history.

(56) References Cited

U.S. PATENT DOCUMENTS

| | | | |
|---|---|---|---|
| 2004/0202300 A1* | 10/2004 | Cooper et al. | 379/201.01 |
| 2005/0272408 A1* | 12/2005 | Wilkes-Gibbs et al. | 455/412.2 |
| 2007/0049255 A1* | 3/2007 | Bhakta et al. | 455/412.2 |
| 2007/0243858 A1* | 10/2007 | Marathe et al. | 455/412.2 |

FOREIGN PATENT DOCUMENTS

KR    1020040001055    1/2004

* cited by examiner

*Primary Examiner* — Kwasi Karikari
(74) *Attorney, Agent, or Firm* — H.C. Park & Associates, PLC

(57) ABSTRACT

The present invention provides a method for receiving an incoming call at a first mobile communication terminal including registering an identity of at least one second mobile communication terminal capable of performing local wireless communication with a first mobile communication terminal; checking, after receiving the incoming call at the first mobile communication terminal, whether a user's input is received by the first mobile communication terminal to accept the incoming call during a first time duration; and transmitting, if the user input is not received by the first mobile communication terminal, absence information to the second mobile communication terminal notifying the second mobile communication terminal of reception of the incoming call at the first mobile communication terminal using local wireless communication.

The method also enables a second user to receive an incoming call through the first or second mobile communication terminals instead of the first user during the first user's absence, thereby minimizing the inconvenience to the first user of missing important calls made to the first mobile communication terminal.

11 Claims, 4 Drawing Sheets

METHOD FOR RECEIVING INCOMING CALL IN MOBILE COMMUNICATION TERMINAL USING LOCAL WIRELESS COMMUNICATION DURING USER ABSENCE

CROSS REFERENCE TO RELATED APPLICATIONS

This application claims priority from and the benefit of Korean Patent Application No. 10-2006-0071285, filed on Jul. 28, 2006, which is hereby incorporated by reference for all purposes as if fully set forth herein.

BACKGROUND OF THE INVENTION

1. Field of the Invention

The present invention relates to a method for receiving an incoming call, and more particularly, to a method for receiving an incoming call at a first mobile communication terminal during the user's absence and for notifying the user of reception of the incoming call at a second mobile communication terminal.

2. Discussion of the Background

The advancement of mobile communication technology has enabled a user of a mobile communication terminal to place and receive voice calls with little limitation as to time and location. As mobile communication terminals have recently evolved to incorporate diverse functions, such as delivering text and video information, MP3 player, and games, a user is able to enjoy these functions through a screen on the mobile communication terminal.

Despite its various functions, a mobile communication terminal's main function is to place and receive voice calls. Mobile communication terminals may typically notify users of the reception of incoming calls through ringtones, vibrations, and/or illuminated indicators. In particular, when users are in the office or at public facilities, they switch their mobile communication terminal to a vibration or illuminated indicator mode to minimize inconvenience to others caused by the loudness of the ringtone.

However, users may not receive an incoming call because they are located away from their mobile communication terminal or because they fail to hear the ringtone, feel the vibration of the mobile communication terminal, or notice the illuminated indicator. In particular, if the mobile communication terminal is set to vibrate or illuminate an indicator upon receiving an incoming call and the user is away from his or her mobile communication terminal or preoccupied and unable to answer the mobile communication terminal, the user is likely to miss the incoming call.

SUMMARY OF THE INVENTION

The present invention provides a method for receiving an incoming call at a mobile communication terminal using local wireless communication during the user's absence.

Additional features of the invention will be set forth in the description which follows, and in part will be apparent from the description, or may be learned by practice of the invention.

The present invention discloses a method for receiving an incoming call at a mobile communication terminal including registering an identity of at least one second mobile telecommunication terminal in a first mobile communication terminal, the at least one second mobile communication terminal being capable of performing local wireless communication with the first mobile communication terminal; check, after receiving the incoming call at the first mobile communication terminal, whether a user input is received by the first mobile communication terminal to accept the incoming call during a first time duration; and transmitting, if user input is not received by the first mobile communication terminal during the first duration, absence information notifying the second mobile communication terminal of reception of the incoming call at the first mobile communication terminal using a local wireless communication.

The present invention also discloses a method for receiving an incoming call at a mobile communication terminal including receiving the incoming call at a first mobile communication terminal; checking whether the incoming call is accepted by the first mobile communication terminal during a time duration after receiving the incoming call at the first mobile communication terminal; and transmitting, if the incoming signal is not accepted by the first mobile communication terminal during the time duration, absence information to a second mobile communication terminal to notify the second mobile communication terminal of reception of the incoming call at the first mobile communication terminal through a local wireless communication.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
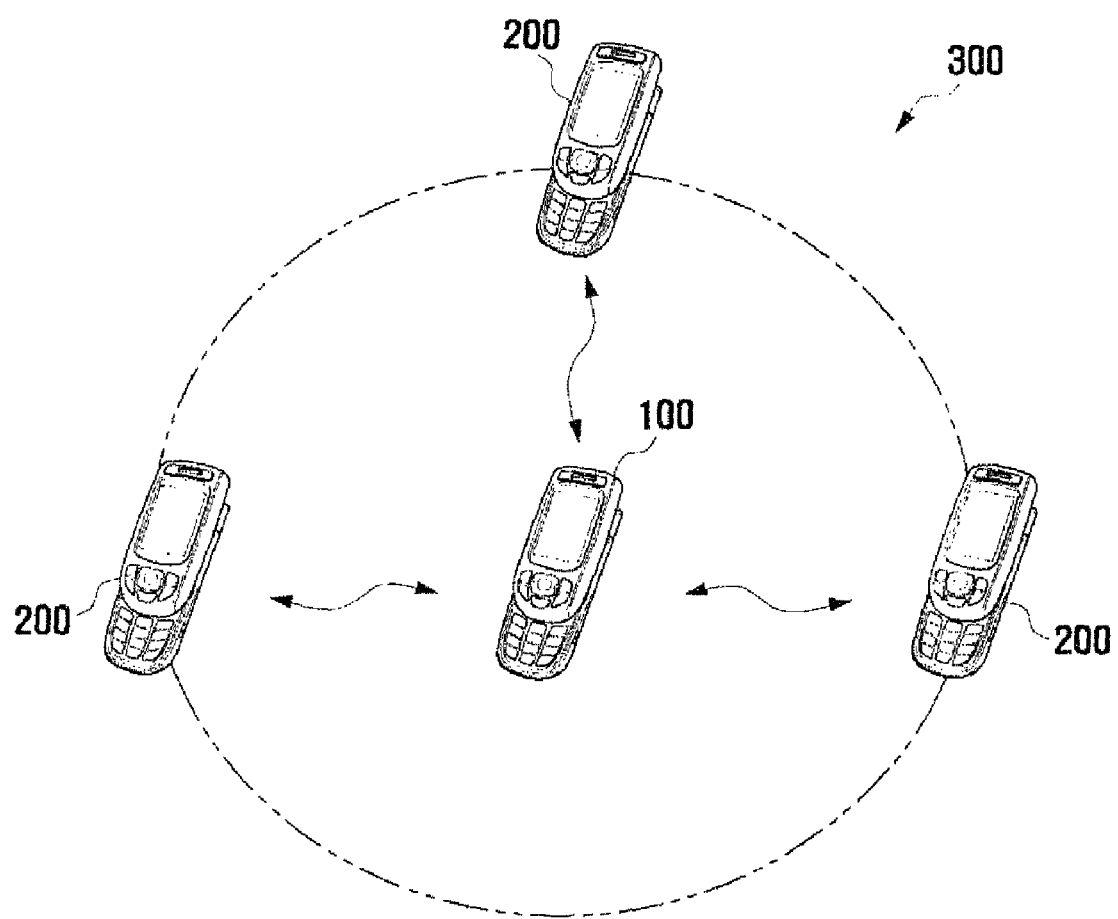
FIG. 1 is a diagram illustrating a system for receiving an incoming call at a mobile communication terminal using local wireless communication during a called party's absence according to an exemplary embodiment of the present invention.

The invention is described more fully hereinafter with reference to the accompanying drawings, in which embodiments of the present invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer, there are no intervening elements or layers present.

Figure 2:
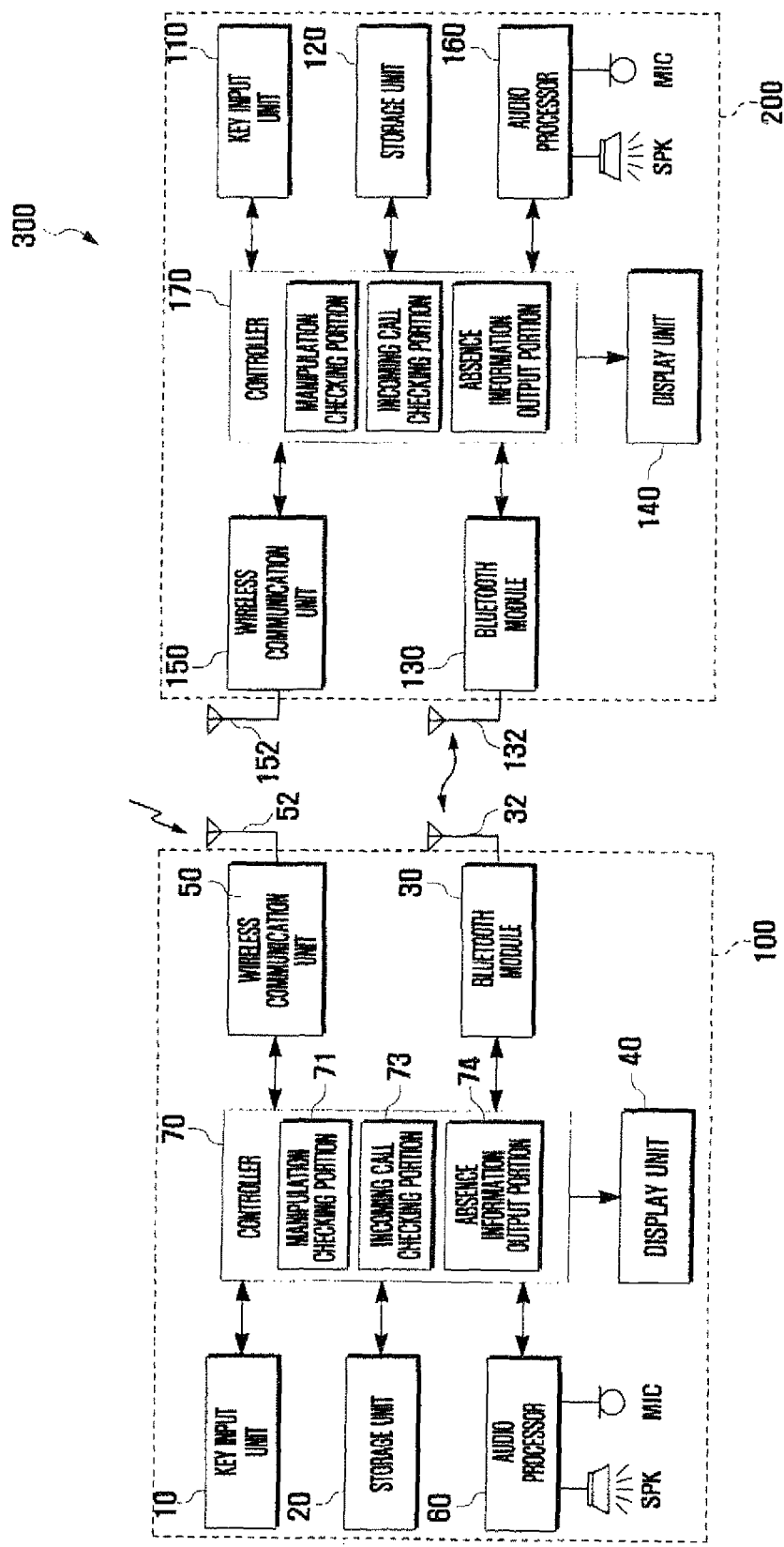
FIG. 2 is a block diagram illustrating a configuration of the system of FIG. 1.

FIG. 1 is a diagram illustrating a system 300 for receiving an incoming call at a mobile communication terminal using local wireless communication during a called party's absence according to an exemplary embodiment of the present invention. FIG. 2 is a block diagram illustrating a configuration of the system of FIG. 1.

Referring to FIG. 1 and FIG. 2, the system 300 includes a first mobile communication terminal 100 possessed by a user (hereinafter referred to as a 'first user') and a plurality of second mobile communication terminals 200 possessed by the first user or at least one other user (hereinafter referred to as a 'second user') and registered in the first mobile communication terminal 100. The first and second mobile communication terminals 100 and 200 are capable of performing local wireless communications. "Registration" refers to a process of setting an identity of a second mobile communication terminal 200 in the first mobile communication terminal 100.

The first mobile communication terminal 100 communicates with the second mobile communication terminal 200 using a local wireless communication technology such as Bluetooth®, Infrared, or Zigbee®. In the present exemplary embodiment, Bluetooth® is used as the local wireless communication technology.

The first and second mobile communication terminals 100 and 200 include a Bluetooth® module 30 and 130, respectively. Because the first mobile communication terminal 100 has substantially the same configuration as the second mobile communication terminal 200, the following description primarily refers to the elements of the first mobile communication terminal 100.

The first mobile communication terminal 100 includes a key input unit 10, a storage unit 20, a Bluetooth® module 30, a display unit 40, a wireless communication unit 50, an audio processor 60, and a controller 70.

The key input unit 10 includes a plurality of keys with which a first user operates the first mobile communication terminal 100 and delivers selection information input by the first user to the controller 70.

The storage unit 20 stores various programs necessary for controlling the operation of the first mobile communication terminal 100 and the information generated during the control operation of the controller 70 or the use of the first mobile communication terminal 100 by the first user. In particular, the storage unit 20 stores absence information and the directory of the second mobile communication terminal 200 that will receive the notice of an incoming call. The directory of the second mobile communication terminal 200 contains a phone number, an e-mail address, and an address of the Bluetooth® module 130.

The absence information may contain audio, video, or text information that will be used to notify the second mobile communication terminal 200 of the reception of an incoming call at the first mobile communication terminal 100. The storage unit 20 also stores information generated while setting requirements for wireless communication between the first and second mobile communication terminals 100 and 200, such as a first and a second predetermined time duration and designated phone number.

The Bluetooth® module 30 allows the first mobile communication terminal 100 to perform Bluetooth® communication with the second mobile communication terminal 200 according to a Bluetooth® standard. More specifically, the Bluetooth® module 30 performs a series of operations for transmitting absence information and receiving a control signal through Bluetooth® communication with the second mobile communication terminal 200. The Bluetooth® module 30 modulates absence information stored in the storage unit 20 into a Bluetooth® signal, amplifies the Bluetooth® signal, and transmits the resulting signal through an antenna 32. The Bluetooth® module 30 also receives a control signal from the second mobile communication terminal 200 through the antenna 32 and outputs the control signal to the controller 70.

The display unit 40 displays a state in which an incoming call has been received and data stored in the storage unit 20, including menus for various functions being executed on the first mobile communication terminal 100, as images on the screen. The display unit 40 is typically a Liquid Crystal Display (LCD).

A display unit 140 of the second mobile communication terminal 200 displays video or text information contained in the absence information received from the Bluetooth® module 30.

The wireless communication unit 50 modulates and converts the frequency of a signal output from the controller 70 and transmits the resulting radio signal through an antenna 52. The wireless communication unit 50 also separates a reception signal from a radio signal received through the antenna 52, converts and demodulates the frequency of the signal, and outputs the resulting signal to the controller 70. In the case described here, the reception signal contains an incoming call.

The audio processor 60 is controlled by the controller 70 to digitalize an audio signal being input through a microphone MIC, and to demodulate audio information received through the wireless communication unit 50 for output through a speaker SPK.

An audio processor 160 of the second mobile communication terminal 200 demodulates audio information in the absence information received from the Bluetooth® module 30 of the first mobile communication terminal 100 and outputs the audio information through the speaker SPK.

The controller 70 controls the overall operation of components in the first mobile communication terminal 100. In particular, the controller 70 includes a manipulation checking portion 71, an incoming call checking portion 73, and an absence information output portion 74. The manipulation checking portion 71 checks whether there is any user input to the first mobile communication terminal 100 during a first predetermined time duration after reception of an incoming call through the wireless communication unit 50. If there is no user input to the first mobile communication terminal 100, the incoming call checking portion 73 then checks whether the incoming call is a call having a corresponding designated phone number. If the incoming call is a call having a corresponding designated phone number, the absence information output portion 74 transmits the absence information to the second mobile communication terminal 200 through the Bluetooth® module 30 to notify of reception of the incoming call at the first mobile communication terminal 100. If the incoming call is not for a corresponding designated phone number, the controller 70 controls the display unit 40 to display caller information during the user's absence after an incoming call wait time duration has elapsed.

While transmitting the absence information through the Bluetooth® module 30 to the second mobile communication terminal 200, the controller 70 checks whether the time duration of transmitting the absence information to the second mobile communication terminal 200 ("transmission time") exceeds a second predetermined time duration. If no notification is received from the second mobile communication terminal confirming receipt of the absence information, the controller 70 transmits the absence information to the second mobile communication terminal 200 until the transmission time exceeds the second predetermined time duration. If the transmission time exceeds the second predetermined time duration, which may happen when the second mobile communication terminal 200 is too far from the first mobile communication terminal 100, the controller 70 suspends transmission of the absence information through the Bluetooth® module 30.

If, however, the second mobile communication terminal 200 is within local wireless communication range of the first mobile communication terminal 100, the second mobile communication terminal 200 receives the absence information through the Bluetooth® module 130 to notify the second user of the absence information, and notifies the first mobile communication terminal 100 of receipt of the absence information at the second communication terminal 200.

Thus, even if the first user does not recognize reception of the incoming call for the designated phone number by the first mobile communication terminal 100, the first mobile communication terminal 100 transmits the absence information to the nearby second mobile communication terminal 200. The second user of the second mobile communication terminal 200 that has received the absence information can notify the first user of reception of the incoming call at the first mobile communication terminal 100, minimizing the drawback of the first user not receiving the incoming call.

Figure 3:
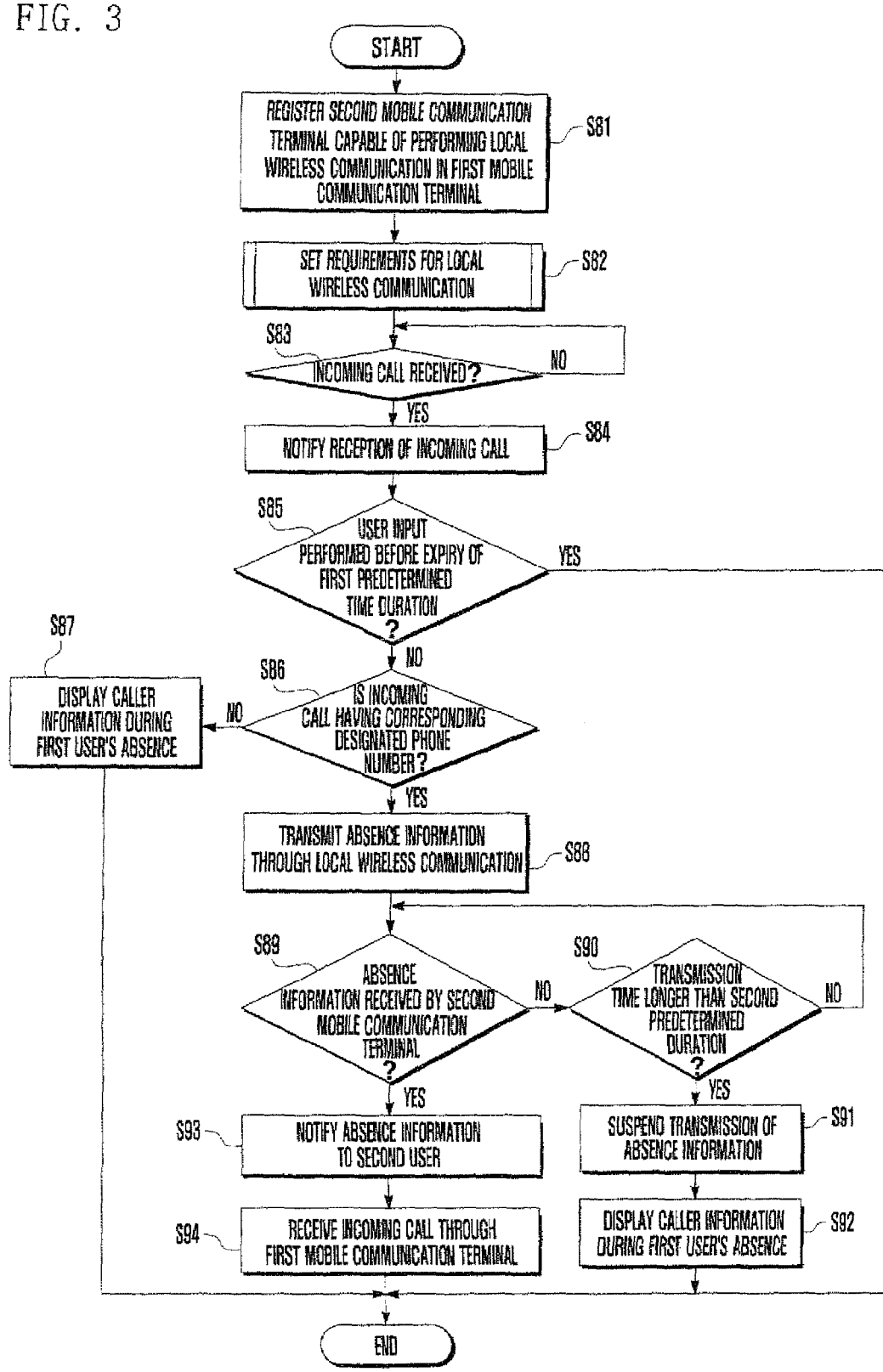
FIG. 3 is a flowchart illustrating a method for receiving an incoming call at a mobile communication terminal using local wireless communication during a called party's absence according to an exemplary embodiment of the present invention.
Figure 4:
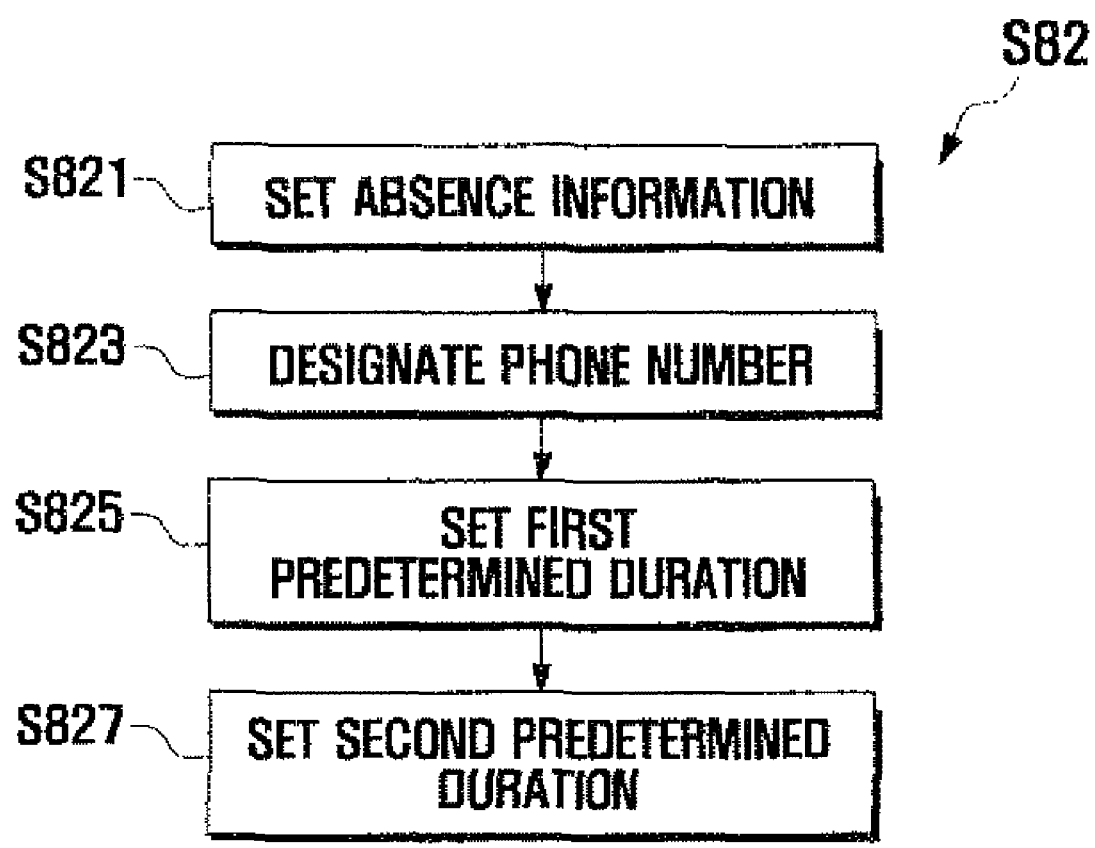
FIG. 4 is a detailed flowchart illustrating a step of setting requirements for local wireless communications for the method of FIG. 3.

A method for receiving an incoming call at a mobile communication terminal during a user's absence is described with reference to FIG. 1, FIG. 2, FIG. 3, and FIG. 4. FIG. 3 is a flowchart illustrating a method for receiving an incoming call at a mobile communication terminal using local wireless communication during a called party's absence according to an exemplary embodiment of the present invention. FIG. 4 is a detailed flowchart illustrating a step of setting requirements for local wireless communications for the method of FIG. 3.

Referring to FIG. 1, FIG. 2, FIG. 3, and FIG. 4, the method begins by registering an identity of a second mobile communication terminal 200 capable of performing local wireless communications with the first mobile communication terminal 100 in the first mobile communication terminal 100 (S81). For example, at least one second mobile communication terminal 200 may be registered through a local wireless communication setup menu of the first mobile communication terminal 100.

The local wireless communication setup menu is used to set requirements for local wireless communications (S82). More specifically, as shown in FIG. 4, absence information that will be sent to the second mobile communication terminal 200 is set (S821), and at least one phone number to which the absence information will be sent is designated (S823). A first predetermined time duration is also set for checking the time duration during which there is no user input to the first mobile communication terminal 100 (S825). Further, a second predetermined time duration is set for checking the time duration of transmitting the absence information to the second mobile communication terminal 200 (S827). The local wireless communication steps (S821 through S827) may be set in any order, and are described later in detail.

Thereafter, the controller 70 of the first mobile communication terminal 100 checks whether an incoming call is received through the antenna 52 of the wireless communication unit 50 while the first mobile communication terminal 100 is in a standby state (S83).

Upon receipt of the incoming call, the controller 70 notifies the first user of reception of the incoming call using one of a ringtone mode, a vibration mode, a vibration and ringtone mode, and an illuminated indicator mode (S84).

The controller 70 checks whether there is user input to the first mobile communication terminal 100 prior to expiration of the first predetermined time duration (S85). More specifically, after receiving the incoming call, the manipulation checking portion 71 of the first mobile communication terminal 100 checks whether the user at the first communication terminal 100 accepted the incoming call during the first predetermined time duration (S85). The user may accept the incoming call by pressing keys on the key input unit 10 of the first mobile communication terminal 100 or by activating the display unit 40.

Preferably, the first predetermined time duration is shorter than an incoming call wait time duration. If the first predetermined time duration exceeds the incoming call wait time, the incoming call cannot be received through the second mobile communication terminal 200. In order for the second user to receive the incoming call within the incoming call wait time duration, the first predetermined time duration is preferably shorter than half of the incoming call wait time. For example, if ringtones play eight times within the incoming call wait time, the first predetermined time duration may be set to the time it takes to play two or four ringtones.

If no user input is received by the first mobile communication terminal 100 prior to expiration of the first predetermined time duration, the incoming call checking portion 73 checks whether an incoming call is a call having a corresponding designated phone number (S86). The designated phone number may be a predesignated phone number selected from phone numbers contained in a phone book or may be all phone numbers.

If the incoming call is not a call having a corresponding designated phone number, the controller 70 controls the display unit 40 to display caller information during the user's absence after the incoming call wait time duration has elapsed (S87).

However, if the incoming call is from a designated phone number, the first mobile communication terminal 100 transmits absence information to the second mobile communication terminal 200 using local wireless communications (S88). Hence, the absence information output portion 74 outputs absence information for transmission to the second mobile communication terminal 200 through the Bluetooth® module 30.

While transmitting the absence information, the controller 70 checks whether the second mobile communication terminal 200 has notified the first mobile communication terminal 100 of the receipt of the absence information (S89).

If the second mobile communication terminal 200 does not receive the absence information transmitted by the first mobile communication terminal 100, the controller 70 then checks whether the time duration of transmitting the absence information to the second mobile communication terminal 200 ("transmission time") exceeds the second predetermined time duration (S90).

If the transmission time does not exceed the second predetermined time duration the process returns to step S89 and, the Bluetooth® module 30 of the first mobile communication terminal 100 continues to send the absence information. If, however, the transmission time exceeds the second predetermined time duration, the controller 70 suspends transmission of the absence information through the Bluetooth® module 30 (S91). The controller 70 then controls the display unit 40 to display caller information during the user's absence after the incoming call wait time duration has elapsed (S92).

Preferably, the second predetermined time duration is set shorter than a time difference between the first predetermined time duration and the incoming call wait time. If the second predetermined time duration is set longer than the difference, the second predetermined time duration may last longer than the incoming call wait time. In this case, even if the second mobile communication terminal 200 receives the absence information within the second predetermined time duration, it cannot receive the incoming call from the first mobile communication terminal 100 because the display unit 40 of the first mobile communication terminal 100 would have already displayed the caller information during the user's absence.

If either of the first or second predetermined time durations is set, the other may be automatically or independently set. For example, if the first predetermined time duration is set first, the second predetermined time duration may be automatically set to the difference of the first predetermined time duration and the incoming call wait time, or independently set according to the first user's selection. In a preferred embodiment of the present invention, the second predetermined time duration is one-third (or one-quarter) of the call wait time.

At step S89, if the second mobile communication terminal 200 is located within a predetermined distance from the first mobile communication terminal 100, the second mobile communication terminal 200 receives the absence information to notify the second user of the absence information, and notifies the first mobile communication terminal 100 of the receipt of the absence information (S93). The Bluetooth® module 130 of the second mobile communication terminal 200 receives the absence information and then outputs the absence information through a speaker SPK or display on the display unit 40. For example, if the absence information contains audio information, the second mobile communication terminal 200 may output the audio information through the speaker SPK to notify the second user. If the absence information contains video or text information, the second mobile communication terminal 200 may display the video or text information on the display unit 140 to notify the second user.

Upon receiving the absence information at the second mobile communication terminal 200, the second user may then notify the first user of the reception of the incoming call at the first mobile communication terminal 100, allowing the first user to receive the incoming call through the first mobile communication terminal 100 (S94).

Thus, the method allows the first user to be notified of receipt of an incoming call during his or her absence by a second user, thereby increasing the probability of receiving the incoming call compared to directly receiving the incoming call.

While the present invention has been particularly shown and described with reference to exemplary embodiments thereof, these exemplary embodiments are provided not to limit the scope of the invention, but to serve only for illustrative purposes. It will be understood by those of ordinary skill in the art that various changes in form and details may be made to the exemplary embodiments without departing from the spirit and scope of the present invention as defined in the appended claims. For example, in the described exemplary embodiments, a first user receives an incoming call through a first mobile communication terminal 100 by being notified of reception of an incoming call by a second user that has received absence information at a second mobile communication terminal 200; however, the first user may also receive the incoming call through the second mobile communication terminal 200. In this case, the first user receives the incoming call through the second mobile communication terminal 200, which has received the incoming call from the first mobile communication terminal 100 using Bluetooth® communication, instead of directly through the first mobile communication terminal 100.

Alternatively, when the first user is absent, the second user, having received absence information at the second mobile communication terminal 200, may receive an incoming call through the first or second mobile communication terminal 100 and 200 in place of the first user.

Further, in the above described exemplary embodiments, it is determined whether an incoming call is for a corresponding designated phone number after checking whether there is any user input into the first mobile communication terminal 100; however, the process may proceed in reverse order.

According to the present invention, reception of an incoming call at a first mobile communication terminal 100 is notified to a second mobile communication terminal 200 registered in and located within a predetermined distance from the first mobile communication terminal 100 using local wireless communication, thus minimizing a first user's failure to receive the incoming call as long as the first and second mobile communication terminals 100 and 200 are within a local wireless communication range of each other.

Further, the present invention enables a second user to receive an incoming call through the first or second mobile communication terminal 100 and 200 instead of the first user during the first user's absence, thus minimizing the inconvenience to the first user of missing the incoming call made to the first mobile communication terminal 100. Thus, the present invention may minimize the inconvenience of missing important calls made to a mobile communication terminal.

Although exemplary embodiments of the present invention have been shown and described in detail hereinabove, it should be clearly understood that many variations and/or modifications of the basic inventive concepts taught herein, which may appear to those skilled in the present art, will still fall within the scope and spirit of the present invention. Thus, it is intended that the present invention cover the modifications and variations of this invention provided they come within the scope of the appended claims and their equivalents.

What is claimed is:

1. A method for receiving an incoming call at a mobile communication terminal, comprising:

registering an identity of a second mobile communication terminal in a first mobile communication terminal, the second mobile communication terminal being capable of performing local wireless communication with the first mobile communication terminal;

checking, after receiving the incoming call at the first mobile communication terminal, whether the incoming call received by the first mobile communication terminal has been accepted during a first time duration;

transmitting, if the incoming call received by the first mobile communication terminal has not been accepted during the first time duration, absence information notifying the second mobile communication terminal of reception of the incoming call at the first mobile communication terminal using a local wireless communication;

checking, if the second mobile communication terminal does not notify the first mobile communication terminal of receipt of the absence information, whether the time duration of transmitting the absence information to the second mobile communication terminal exceeds a second time duration;

suspending, if the time duration of transmitting the absence information exceeds the second time duration, transmission of the absence information; and setting, after registering the identity of the second mobile communication terminal and before checking whether the user has accepted the incoming call, requirements for the local wireless communication between the first mobile communication terminal and the second mobile communication terminal, wherein setting the requirements comprises:

setting the absence information used to notify the second mobile communication terminal of reception of the incoming call at the first mobile communication terminal, designating a phone number to which the absence information is to be sent, setting the first time duration for checking the time duration, and setting the second time duration for checking the time duration of transmitting the absence information to the second mobile communication terminal.

2. The method of claim 1, wherein the first time duration is shorter than an incoming call wait time duration, wherein the incoming call wait time duration is the maximum time period that a caller can wait before an automatic cut-off.

3. The method of claim 1, wherein the user input into the first mobile communication terminal comprises at least one of inputting through a key input unit and activating a display unit.

4. The method of claim 1, further comprising:

checking, before transmitting the absence information to the second mobile communication terminal, whether the incoming call has a corresponding designated phone number, wherein the absence information is transmitted only if the incoming call has the corresponding designated phone number.

5. The method of claim 2, further comprising:

receiving, if the second mobile communication terminal is within range of the first mobile communication terminal to receive the local wireless communication, the absence information at the second mobile communication terminal, and notifying the first mobile communication terminal of receipt of the absence information at the second mobile communication terminal.

6. The method of claim 1, wherein the second time duration is equal to a difference between the first time duration and the incoming call wait time duration.

7. The method of claim 1, wherein the absence information comprises at least one of audio, video, and text information.

8. The method of claim 1, wherein the local wireless communication comprises at least one of Bluetooth®, Infrared, and Zigbee®.

9. A method for receiving an incoming call at a mobile communication terminal, comprising:

receiving the incoming call at a first mobile communication terminal;

checking whether the incoming call is accepted by the first mobile communication terminal during a first time duration after receiving the incoming call at the first mobile communication terminal;

transmitting, if the incoming call is not accepted by the first mobile communication terminal during the first time duration, absence information to a second mobile communication terminal to notify the second mobile communication terminal of reception of the incoming call at the first mobile communication terminal through a local wireless communication;

checking, if the second mobile communication terminal does not notify the first mobile communication terminal of receipt of the absence information, whether the time duration of transmitting the absence information to the second mobile communication terminal exceeds a second time duration at the first mobile communication terminal;

suspending, if the time duration of transmitting the absence information exceeds the second time duration, transmission of the absence information at the first mobile communication terminal;

checking, after receiving the incoming call at the first mobile communication terminal and before checking whether the incoming call is accepted by the first mobile communication terminal, whether the incoming call is a call having a corresponding designated phone number; and accepting, if the incoming call is a call having the corresponding designated phone number, the incoming call by the first mobile communication terminal.

10. The method of claim 9, further comprising:

receiving the absence information at the second mobile communication terminal;

notifying a user at the second mobile communication terminal of receipt of the absence information at the second mobile communication terminal; and receiving the incoming call through one of the first mobile communication terminal and the second mobile communication terminal.

11. The method of claim 10, wherein an identity of the second mobile communication terminal is registered in the first mobile communication terminal as a mobile communication terminal capable of performing the local wireless communication with the first mobile communication terminal.

* * * * *